United States Patent [19]

Shibutani

[11] Patent Number: 5,138,476

[45] Date of Patent: Aug. 11, 1992

[54] POLARIZATION DEVERSITY HETERODYNE RECEIVER OF A BASEBAND COMBINING TYPE IN WHICH I.E. SIGNALS ARE ADJUSTED BY NEGATIVE FEEDBACK FROM A DEVICE OUTPUT SIGNAL

[75] Inventor: Makoto Shibutani, Tokyo, Japan

[73] Assignee: NEC Corporation, Tokyo, Japan

[21] Appl. No.: 501,995

[22] Filed: Mar. 28, 1990

[30] Foreign Application Priority Data

Mar. 28, 1989 [JP] Japan .................................... 1-77181

[51] Int. Cl.$^5$ .............................................. H04B 10/06
[52] U.S. Cl. .................................... 359/191; 359/189
[58] Field of Search ................ 455/619, 616; 359/189, 359/190, 191, 192, 194, 110

[56] References Cited

FOREIGN PATENT DOCUMENTS

| 0251062 | 1/1988 | European Pat. Off. ............ 455/619 |
| 0013039 | 1/1983 | Japan .................................... 455/619 |
| 0095633 | 5/1986 | Japan .................................... 455/619 |
| 0177832 | 8/1986 | Japan .................................... 455/619 |
| 0048021 | 2/1988 | Japan .................................... 455/619 |
| 8607513 | 12/1986 | PCT Int'l Appl. ................. 455/619 |

OTHER PUBLICATIONS

Smith, "Techniques for Multigigabit Coherent Optical Transmission", Journal of Lightwave Technology, vol. LT-5, No. 10, pp. 1466-1478, Oct. '87.

K. Emura et al, "Novel Optical FSK Heterodyne Single Filter Detection System Using A Directly Modulated DFB-Laser Diode", Electronics Letters, vol. 20, No. 24, Nov. 22, 1984, pp. 1022-1023.

Davis et al, "Coherent Optical Receiver for 680 Mbit/s Using Phase Diversity", Electronics Letters, vol. 22, No. 1, Jan. 2, 1986, p. 10.

Primary Examiner—Edward L. Coles, Sr.
Assistant Examiner—Kinfe-Michael Negash
Attorney, Agent, or Firm—Sughrue, Mion, Zinn, Macpeak & Seas

[57] ABSTRACT

In a polarization diversity heterodyne receiving device comprising a first arrangement (16 to 18, 21 to 24, 26, 27) for receiving an incident signal beam having an incident beam intensity and an incident state of polarization to produce IF signals having signal amplitudes and a second arrangement (31, 32) for demodulating the IF signals into baseband signals which are combined into a device output signal having an output amplitude independent of the incident state, a comparing arrangement (34 to 36) produces a control signal which is feedback supplied to the first arrangement to adjust the signal amplitudes in a common ratio so as to render the output amplitude independent of the incident beam intensity. Preferably, the first arrangement comprises a unit (16 to 18, 21, 22) for detecting the incident signal beam to produce detected signals, IF amplifiers for amplifying the detected signals into amplifier output signals, and gain adjusters for giving first and second gains to the respective amplifier output signals to produce the IF signals. The control signal is delivered to the gain adjusters to adjust the first and the second gains. Alternatively, the control signal is used to control optical detectors for detecting into the detected signals optical beams which comprise orthogonally polarized components of a coupled beam consisting of the incident signal beam and a local oscillation beam.

4 Claims, 3 Drawing Sheets ated. Each of the intermediate frequency signal has a signal intensity dependent on a combination of the incident beam intensity and the incident state of polarization. It is objectionable to demodulate the intermediate frequency signals with only the signal intensities rendered constant with no attention directed to the fluctuation in the state of polarization. If supplied with such intermediate frequency signals, the demodulators would produce the baseband signals, each with its baseband amplitude kept constant. This makes it impossible to carry out the square-law combination. As a result, the reception sensitivity is seriously degraded.

POLARIZATION DEVERSITY HETERODYNE RECEIVER OF A BASEBAND COMBINING TYPE IN WHICH I.E. SIGNALS ARE ADJUSTED BY NEGATIVE FEEDBACK FROM A DEVICE OUTPUT SIGNAL

BACKGROUND OF THE INVENTION

This invention relates to a polarization diversity heterodyne receiving device of a baseband combining type.

Such a receiving device is for use in an optical communication network in receiving an incident signal or optical beam through an optical fiber with an incident beam intensity. While transmitted through the optical fiber, the incident signal beam is subjected to disturbances or turbuleneces to be received by the receiving device with an incident state of polarization which complicatedly fluctuates from time to time.

In the manner which will later be described with reference to the accompanying drawing, a polarization diversity heterdyne receiving device comprises an optical heterodyne receiving arrangement for receiving the incident signal beam to produce first and second intermediate frequency (IF) signals having first and second signal amplitudes, respectively. When the receiving device is of a baseband combining type, a demodulating arrangement is used to first demodulate the first and the second intermediate frequency signals into first and second baseband signals, respectively. A signal combiner is used to subsequently combine the first and the second baseband signals into a device output signal having an output amplitude which is independent of the incident state of polarization.

The heterodyne receiving arrangement comprises a coupling and splitting device for coupling and splitting the incident signal beam and a local oscillation beam into first and second optical beams including first and second components of the incident signal beam which are orthogonally polarized components, namely, have orthogonal planes of polarization. An optical detecting device is used in detecting the first and the second optical beams to produce the first and the second intermediate frequency signals.

In the manner described in U.S. patent application Ser. No. 291,885 filed Dec. 29, 1988, by the present inventor et al (European Patent Application No. 88 12 1791.3 filed Dec. 28, 1988). the hetorodyne receiving arrangement may be of a balanced receiver type. Alternatively, the coupling and splitting arrangement may comprise a beam coupler, such as a directional optical coupler, for coupling the incident signal beam and the local oscillation beam into a coupled beam. A polarization beam splitter is used to split the coupled beam into the first and the second optical beams.

In a polarization diversity heterodyne receiving device of the baseband combining type, the first and the second baseband signals have first and second baseband amplitudes, respectively, which are related to the first and the second signal amplitudes of the first and the second intermediate frequency signals, respectively. It is possible to make the receiving device have a least degraded reception sensitivity despite heterodyne reception when the first and the second baseband amplitudes can be rendered quadratically proportional to, namely, proportional to squares of, the first and the second signal amplitudes, respectively. Combination of these baseband signals into the device output signal is called the square-law combination in the art. In practice, the square-law combination is realized by making each of demodulators of the demodulating arrangement have a quadratic characteristic.

In general, an optical signal receiving device must comprise an automatic gain control facility for use in compensating for an undesirable fluctuation in the incident beam intensity. In an optical heterodyne receiving device in particular, an optical detector is used in first detecting the incident signal beam to produce an intermediate frequency signal having a signal intensity. Subseqently, a demodulator is used to demodulate the intermediate frequency signal into the device output signal. Usually, the demodulator has a considerably narrow dynamic range in which the signal intensity is variable. It is therefore necessary to compensate for a variation in the signal intensity of the intermediate frequency signal supplied to the demodulator. In the optical hetorodyne receiving device, gain control is carried out to make the intermediate frequency signal have a constant intensity and thereby to compensate for the fluctuation in the incident beam intensity.

This manner of compensation is not applicable to a polarization diversity heterodyne receiving device of the baseband combining type because of the following facts. In the manner described hetetobefore, the first and the second intermediate frequency signals are individually demodulated. Each of the intermediate frequency signal has a signal intensity dependent on a combination of the incident beam intensity and the incident state of polarization. It is objectionable to demodulate the intermediate frequency signals with only the signal intensities rendered constant with no attention directed to the fluctuation in the state of polarization. If supplied with such intermediate frequency signals, the demodulators would produce the baseband signals, each with its baseband amplitude kept constant. This makes it impossible to carry out the square-law combination. As a result, the reception sensitivity is seriously degraded.

SUMMARY OF THE INVENTION

It is therefore an object of the present invention to provide a polarization diversity heterodyne receiving device in which it is possible to combine two baseband signals into a device output signal according to a square law.

It is another object of this invention to provide a receiving device of the type described, which has an excellent reception sensitivity.

It is still another object of this invention to provide a receiving device of the type described, which is for use in receiving an incident signal beam having an incident beam intensity and an incident state of polarization, both variable, to produce a device output signal having an output amplitude which is kept constant independently of both the incident beam intensity and the incident state of polarization.

It is yet another object of this invention to provide a receiving device of the type described, which comprises a heterodyne receiving arrangement for detecting the incident signal beam to produce two intermediate frequency signals and two demodulators for individually demodulating the intermediate frequency signals into two baseband signals and in which the intermediate frequency signals are given signal intensities in allowable dynamic ranges of the demodulators.

Other objects of this invention will become clear as the description proceeds.

On describing the gist of this invention, it is possible to understand that a polarization diversity heterodyne receiving device of a baseband combining type includes optical heterodyne receiving means for receiving an incident signal beam having an incident beam intensity and an incident state of polarization to produce first and second intermediate frequency signals having first and second signal amplitudes, respectively, demodulating means for demodulating the first and the second intermediate frequency signals into first and second demodulated signals, respectively, and a signal combiner for combining the first and the second baseband signals into a device output signal having an output amplitude independent of the incident state.

According to this invention, the above-understood receiving device is characterized by (A) comparing means for comparing the output amplitude with a reference amplitude to produce a control signal and (B) adjusting means connected to the heterodyne receiving means for adjusting the first and the second signal amplitudes by the control signal in a common ratio so as to render the output amplitude independent of the incident beam intensity.

DESCRIPTION OF THE PREFERRED EMBODIMENTS

Figure 1:
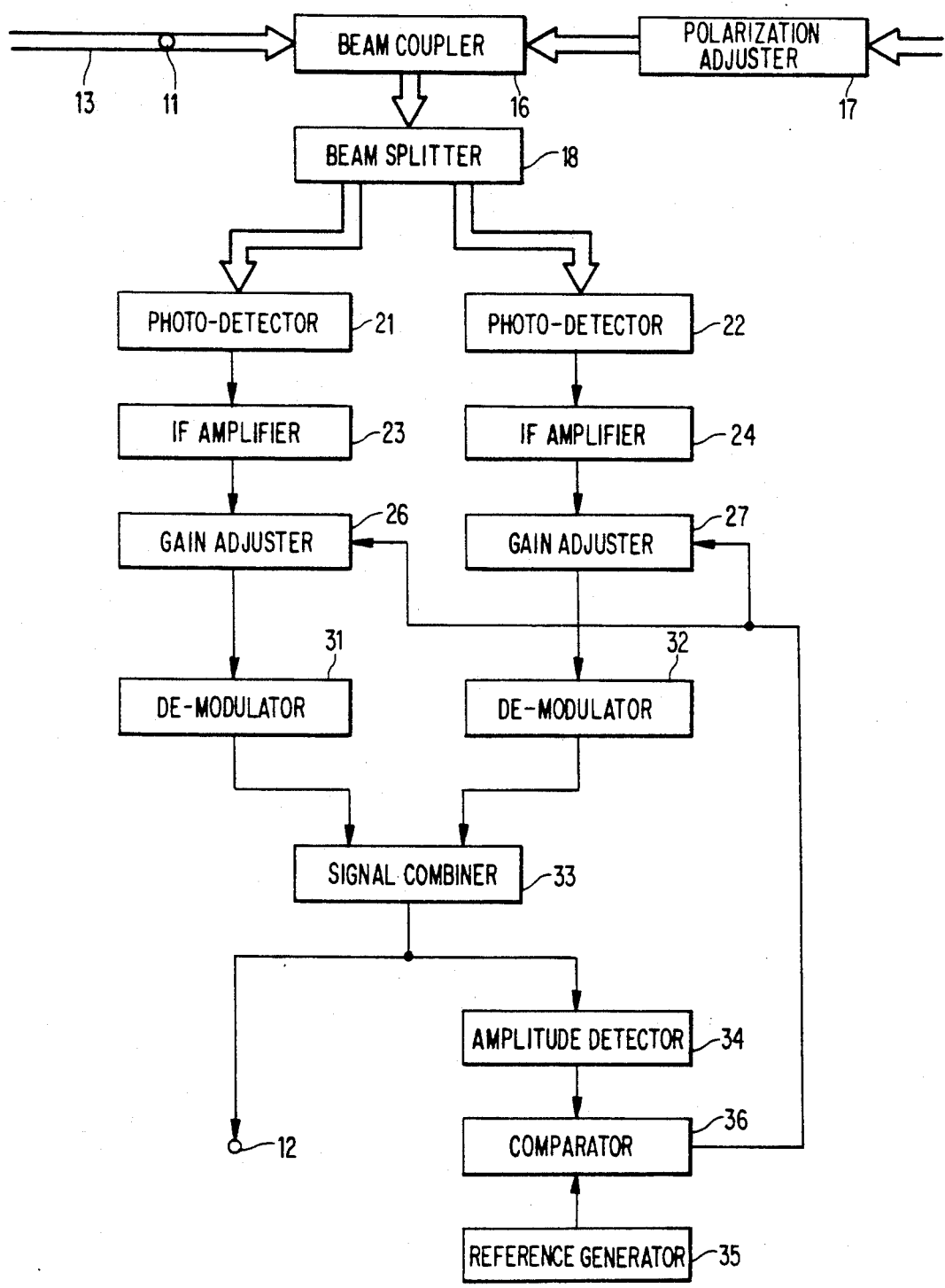
FIG. 1 is a block diagram of a polarization diversity heterodyne receiving device according to a first embodiment of the instant invention.

Referring to FIG. 1, the description will begin with a polarization diversity heterodyne receiving device according to a first embodiment of the present invention. Throughout this specification, the receiving device is of a baseband combining type and is for receiving an incident signal or optical beam which reaches the receiving device with an incident beam intensity and an incident state of polarization. It will be assumed throughout the description related to the drawing figures that the incident signal beam carries information in accordance with frequency shift keying (FSK) modulation at 400 megabits per second.

The receiving device has device input and output terminals 11 and 12. The incident signal beam is supplied to the device input terminal 11 through an optical fiber 13. While transmitted through the optical fiber 13, an optical signal is subjected to disturbances and turbulences. The incident state of polarization is therefore subjected to complicated fluctuations. Similarly, the incident intensity undergoes undesirable fluctuations.

The receiving device comprises an optical heterodyne detecting unit comprising a coupling and splitting device and an optical detecting device. In the example being illustrated, the coupling and splitting device comprises a directional beam coupler 16 supplied with the incident signal beam from the device input terminal 11 and a local oscillation beam from a local beam generator (not shown) through a polarization state adjuster 17 which will presently be described. The beam coupler 16 delivers a coupled beam comprising the incident signal beam and the local oscillation beam to a polarization separator 18, which is typically a polarization beam splitter for splitting or separating the coupled beam into first and second optical beams including first and second orthogonally polarized components of the incident signal beam, respectively.

The optical detecting device comprises first and second optical detectors or photodetectors 21 and 22 supplied from the beam splitter 18 with the first and the second optical beams, respectively. The first and the second optical detectors 21 and 22 produce first and second detected signals. It may be mentioned here that the local beam generator generates the local oscillation beam with a certain state of polarization, namely, with a certain direction of polarization plane. The polarization state adjuster 17 is for adjusting the certain state of polarization in the manner known in the art so that the local oscillation beam is split by the beam splitter 18 into two components which are included in the first and the second optical beams to reach the first and the second optical detectors 21 and 22 with a common intensity.

It is now understood that the optical heterodyne receiving unit is for detecting the incident signal beam to produce the first and the second detected signals. Each of the first and the second detected signals is a best signal between the incident signal beam and the local oscillation beam and has an intermediate frequency (IF).

The receiving device comprises an intermediate frequency amplifying unit for amplifying the first and the second detected signals into first and second intermediate frequency signals having first and second signal amplitudes, respectively. In the amplifying unit, first and second intermediate frequency amplifiers 23 and 24 are used in amplifying the first and the second detected signals into first and second amplifier output signals, respectively. Due to the incident state of polarization, the first and the second amplifier output signals have first and second instantaneous amplitudes, respectively.

In the illustrated example, first and second variable gain adjusters 26 and 27 are used to either amplify or attenuate the first and the second amplifier output signals with first and second gains, respectively, in the manner which will become clear as the description proceeds. In other words, the first variable gain adjuster 26 gives the first gain to the first amplifier output signal. The second variable gain adjuster 27 gives the second gain to the second amplifier output signal. The first and the second variable gain adjusters 26 and 27 thereby produce the first and the second intermediate frequency signals.

Depending on the circumstances, a combination of the optical heterodyne detecting unit and the intermediate frequency amplifying unit is herein called an optical heterodyne receiving arrangement. Supplied with the incident signal beam, the heterodyne receiving arrangement produces the first and the second intermediate frequency signals.

A demodulating arrangement comprises first and second demodulators 31 and 32 for demodulating the first and the second intermediate frequency signals into first and second baseband signals, respectively. A signal combiner 33 combines the first and the second baseband signals into a device output signal having an output amplitude and delivers the device output signal to the device output terminal 12.

In order to make the polarization diversity heterodyne receiving device have a least degraded reception sensitivity, the demodulating arrangement is given a quadratic characteristic. That is, the first baseband signal is made to have a first baseband amplitude which is quadratically proportional to the first signal amplitude of the first intermediate frequency signal, namely, is porportional to a square of the first signal amplitude. The second baseband signal is possessed of a second baseband amplitude which is quadratically proportional to the second signal amplitude. With this, it is possible to make the output amplitude independent of the incident state of polarization and dependent on the incident beam intensity alone.

For this purpose, each of the demodulators 31 and 32 should have the quadratic characteristic. For example, a balanced mixer is used in each of the demodulators 31 or 32 in carrying out frequency shift keying - single filter envelope detection. This type of demodulation is described in detail in a letter contributed by K. Emura and five others to the Electronics Letters, Volume 20, No. 24 (Nov. 22nd, 1984), pages 1022 and 1023, under the title of "Novel Optical FSK Heterodyne Single Filter Detection System Using a Directly Modulated DFB-Laser Diode".

On the other hand, the device output signal is delivered to a comparing arrangement for comparing the output amplitude with a reference amplitude to produce a control signal. In the comparing arrangement, an amplitude detector 34 is supplied with the device output signal and produces an amplitude signal representative of the output amplitude. A reference signal generator 35 generates a reference signal having the reference amplitude. Supplied with the amplitude signal and the reference signal, a comparator 36 compares the output amplitude with the reference amplitude and produces the control signal. A combination of the amplitude detector 34 and the comparator 36 will herein be called a comparator unit, which is supplied with the device output signal and the reference signal for comparing the output amplitude with the reference amplitude to produce the control signal. Such a comparing unit will be readily implemented by one skilled in the art with reference to the following.

In the example being illustrated, an adjusting arrangement is connected to the comparing arrangement and the intermediate frequency amplifying unit to adjust the first and the second gains by the control signal and thereby to adjust the first and the second intermediate frequency signals in a common ratio to the first and the second detected signals. In other words, the signal lines for the control signal is used to carry out negative feedback on the intermediate frequency amplifying unit. More particularly, the control signal is supplied to the first and the second variable gain adjusters 26 and 27 to adjust the first and the second gains so as to adjust the first and the second signal amplitudes in the common ratio. In FIG. 1, the adjusting arrangement or means is depicted by signal lines between the comparator 36 and the first and the second variable gain adjusters 26 and 27. The adjustment arrangement or means includes the comparator 36 as well as the signal lines discussed above.

It may be mentioned here that each of the demodulators 31 and 32 is operable according to the square law only in a considerably narrow dynamic range for the first and the second intermediate frequency signals supplied to the first and the second demodulators 31 and 32 as demodulator input signals. That is to say, the output amplitude of the device output signal is kept constant irrespective of the incident state of polarization only when the first and the second signal amplitudes are kept in a considerably narrow allowable range. The reference amplitude is selected to be equal to a constant level at which the output amplitude should be kept.

It is possible to implement each of the first and the second variable gain adjusters 26 and 27 by a PIN diode which has a resistance value strongly dependent on its forward bias current. The control signal is therefore used to adjust the forward bias current in the first and the second variable gain adjusters 26 and 27. More specifically, the first and the second signal amplitudes of the first and the second intermediate frequency signals are caused to increase in the common ratio when the output amplitude tends to decrease below the reference amplitude. The first and the second signal amplitudes are caused to decrease in the common ratio when the output amplitude tends to increase above the reference amplitude. In this manner, the negative feedback is carried out by the control signal.

Such polarization diversity heterodyne receiving devices were actually manufactured with the incident signal beam allowed to fluctuate due to the incident state of polarization in an allowable fluctuation range of plus 5 dBm. Each of the first and the second variable gain adjusters 26 and 27 had a gain variable range of 25 dB. The first and the second demodulators 31 and 32 were operable according to the square law when the first and the second intermediate frequency signals had signal intensities variable in the allowable fluctuation range. It was therefore possible to keep the output amplitude constant even when the incident intensity varied up to 25 dB and was up to plus 5 dBm. It was thereby possible to suppress a degradation in the reception sensitivity within 1.5 dB despite polarization diversity was resorted to.

Figure 2:
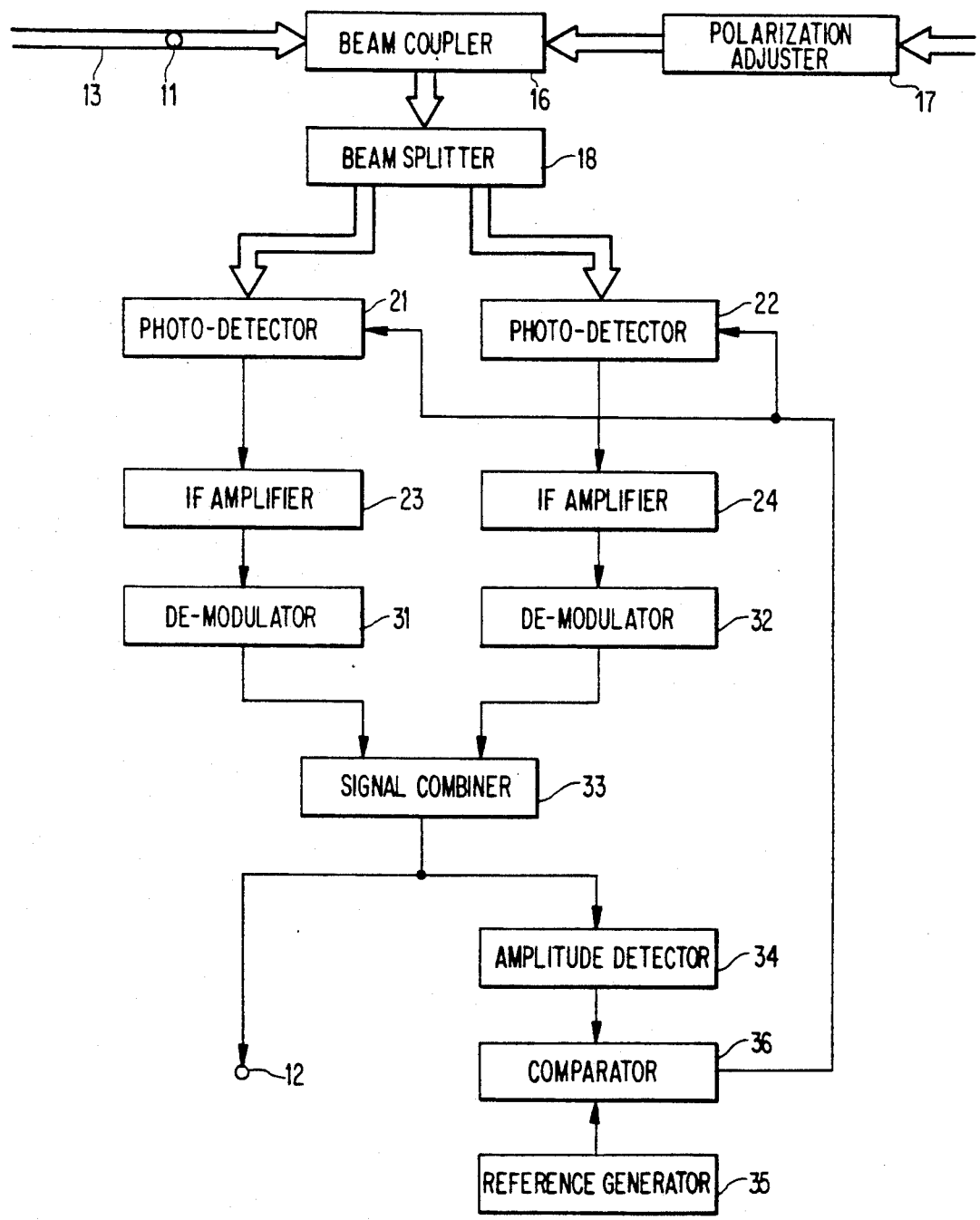
FIG. 2 is a block diagram of a polarization diversity heterodyne receiving device according to a second embodiment of this invention.

Referring to FIG. 2, the description will proceed to a polarization diversity heterodyne receiving device which is of a baseband combining type according to a second embodiment of this invention. Similar parts are designated by like reference numerals and are operable with likewise named signals.

In FIG. 2, the first and the second detected signals are used as the first and the second intermediate frequency signals, respectively, as they are. In other words, the first and the second detected signals are supplied from the first and the second optical detectors 23 and 24 directly to the first and the second demodulators 31 and 32. It is therefore possible to understand that an intermediate frequency supply device is implemented in FIG. 1 by the first and the second variable gain adjusters 26 and 27 and in FIG. 2 by direct connections between the first and the second optical detectors 23 and 24 and the first and the second demodulators 31 and 32.

In FIG. 2, the adjusting arrangement is connected to the comparing arrangement and the optical detecting device to adjust the optical detecting device by the control signal so as to eventually adjust the first and the second signal amplitudes of the first and the second intermediate frequency signals in the above-mentioned common ratio. More particularly, the first and the second optical detectors 21 and 22 are made to produce the first and the second detected signals with their first and second detected amplitudes which are adjusted by the control signal in the common ratio and are used as the first and the second signal amplitudes. In FIG. 2, the adjusting arrangement is depicted by signal lines between the comparator 36 and the first and the second optical detectors 21 and 22.

Preferably, each of the first and the second optical detectors 21 and 22 comprises an avalanche photodiode which has a multiplication factor variable with a bias voltage. A voltage supply circuit is for supplying the bias voltages to the avalanche photodiode. On reading the appended claims, it is possible to understand that first and second avalanche photodiodes are depicted by areas enclosed with rectangular outlines of the first and the second optical detectors 21 and 22. The voltage supply circuit is for supplying first and second bias voltages to the first and the second avalanche photodiodes, respectively, and is depicted by the rectangular outlines, i.e., as part of blocks 21-22.

The control signal is used to make the first detected amplitude increase when the output amplitude of the device output signal tends to decrease below the reference amplitude. The second detected amplitude is made to decrease when the output amplitude tends to increase beyond the reference amplitude. In this manner, negative feedback is carried out by the control signal on the optical detecting device.

Such polarization diversity heterodyne receiving devices were actually manufactured as before. Each of the first and the second avalanche photodiodes was able to adjust the first and the second detected or signal amplitudes in the common ratio in a gain variable range of 10 dB. It was thereby possible to keep the output amplitude constant even when the incident beam intensity varied up to 10 dB.

Attention will be directed to the local oscillation beam as regards its intensity. Each of the first and the second optical detectors 21 and 22 is supplied with a local oscillation beam component of an intensity which is equal to a half of the intensity of the local oscillation beam delivered to a single optical detector used in a simple optical heterodyne receiving device. Each of the first and the second detected or intermediate frequency signals is therefore considerably adversely affected by thermal noise of the optical detector 21 or 22 when compared with an intermediate frequency signal produced by the single optical detector. An avalanche photodiode, however, makes it possible to strengthen the first or the second detected optical signal and to render negligible the adverse effect of the thermal noise. Use of the first and the second avalanche photodiodes in the optical detectors 21 and 22 is therefore preferred not only in adjusting the first and the second signal amplitudes of the first and the second intermediate frequency signals but also in improving the reception sensitivity.

Figure 3:
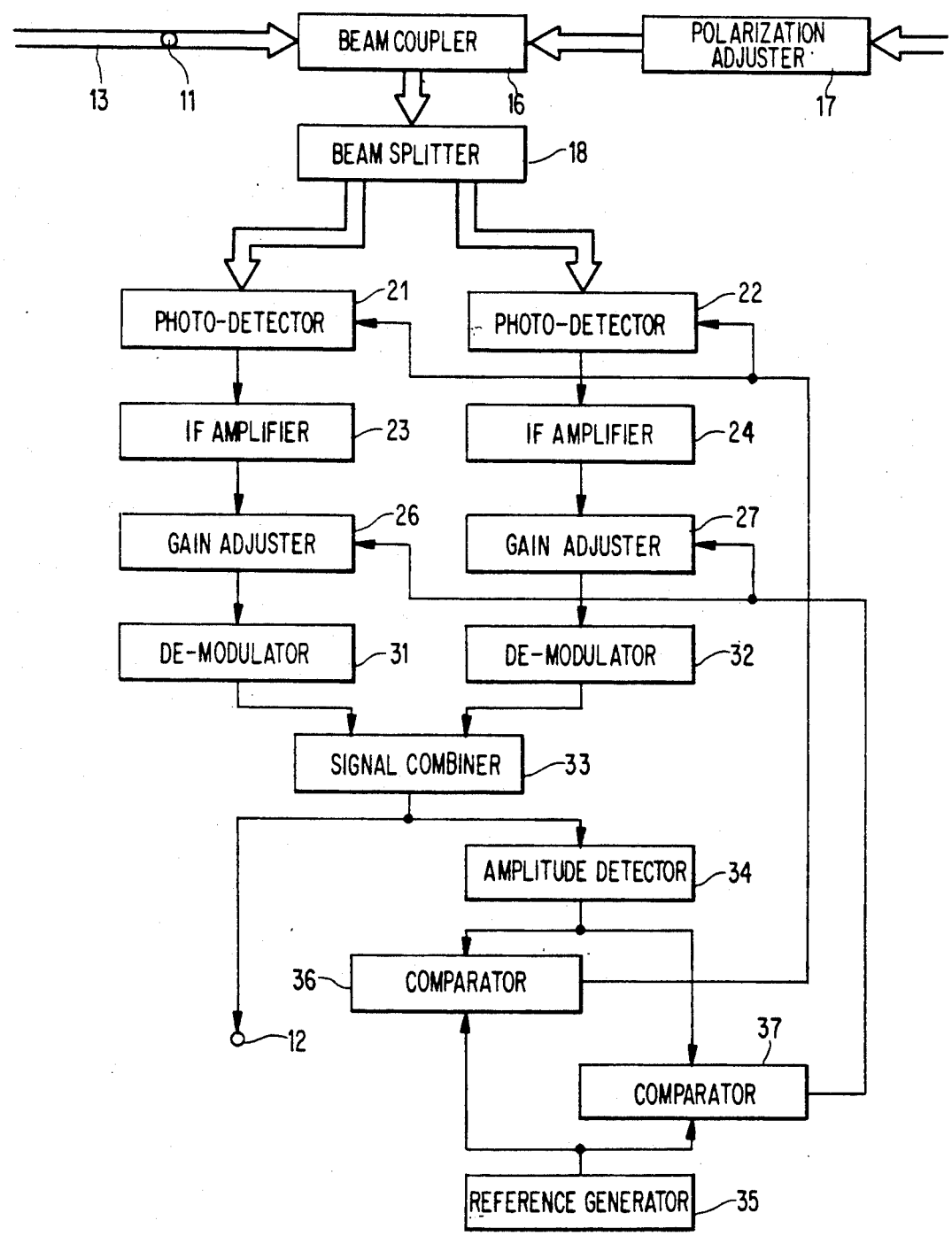
FIG. 3 is a block diagram of a polarization diversity heterodyne receiving device according to a third embodiment of this invention.

Finally referring to FIG. 3, the description will proceed to a polarization diversity heterodyne receiving device according to a third embodiment of this invention. The receiving device is again of a baseband combining type and comprises similar parts which are designated by like reference numerals and are operable with likewise named signals.

In FIG. 3, the intermediate frequency supply device of the intermediate frequency amplifying unit comprises the first and the second variable gain adjusters 26 and 27. In the optical detecting device of the heterodyne detecting unit, the first and the second optical detectors 21 and 22 are for producing the first and the second detected signals with the first and the second detected amplitudes which are adjustable.

The combining arrangement is therefore modified to produce first and second control signals. The adjusting arrangement is connected to the comparing arrangement and to the optical detecting device and the intermediate frequency supply device to use the first control signal in adjusting the first and the second detected amplitudes in a first predetermined ratio and to use the second control signal in adjusting the first and the second gains in a second predetermined ratio. The first and the second signal amplitudes are thereby adjusted in the common ratio. In this manner, the first and the second control signals are used to carry out first and second negative feedback of first and second amounts on the optical detecting device and the intermediate frequency supply device, respectively.

More particularly, the comparator 36 will now be called a first comparator 36. Supplied with the amplitude signal from the amplitude detector 34 and the reference signal from the reference signal generator 35, the first comparator 36 delivers the first control signal to the first and the second optical detectors 21 and 22. Similarly, a second comparator 37 delivers the second control signal to the first and the second variable gain adjusters 26 and 27. Depending on the circumstances, the first and the second control signals are called first and second comparison signals, respectively.

Preferably, the first optical detector 21 comprises a first avalanche photodiode and a voltage supply circuit for supplying a first bias voltage to the first avalanche photodiode like in FIG. 2. The second optical detector 22 comprises a second avalanche photodiode. Controlled by the first control signal, the voltage supply circuit produces the first bias voltage and a second bias voltage which is used to control the second avalanche photodiode. Under the circumstances, the first and the second amounts of negative feedback are preferably in a ratio of 1:2.5. It is possible to use read-only memories (ROM) as the first and the second compartors 36 and 37 with the amplitude signal and the reference signal used as address signals.

With polarization diversity heterodyne receiving devices actually manufactured according to the example being illustrated, each of the first and the second avalanche photodiodes was able to adjust the first and the second detected amplitudes in the first predetermined ratio in a first gain adjustable range of 10 dB. Each of the first and the second gains was adjusted in the second predetermined ratio in a second gain adjustable range of 25 dB. It was thereby possible to keep the output amplitude of the device output signal constant even when the incident beam intensity of the incident signal beam varied up to 35 dB.

It is to be noted here that another polarization diversity heterodyne receiving device is disclosed as a polarization diversity receiver in a prior patent application filed by Makoto Shibutani, the present inventor, in the United States under Ser. No. 07/354,558. In the prior Shibutani patent application, first and second control signals are produced for use in two branches of baseband signals before combination into a device output signal either from the first and the second amplified signals as herein called or from the first and the second intermediate frequency signals. In contrast, either a single control signal or first and second control signals are produced according to the present invention from the device output signal. This simplifies the circuitry to a great extent.

While this invention has thus far been described in specific conjunction with three preferred embodiments thereof, it will now be readily possible for one skilled in the art to put this invention into practice in various other manners. For example, each of the first and the second demodulators 31 and 32 is operable to carry out differential phase shift keying (DPSK) detection described in the above-reference prior Shibutani patent application, frequency shift keying-dual filter envelope detection, continuous phase frequency shift keying (CPFSK) delay detection, or amplitude shift keying (ASK) envelope detection. Each of the first and the second variable gain adjusters 26 and 27 may comprise a dual gate field effect transitor. Alternatively, each of the first and the second gains may be adjusted by adjusting either the bias voltage of a field effect transistor or the bias current of a discrete transistor. The incident signal beam may have a different bit rate, such as a 1.2-GHz bit rate described in the prior Shibutani patent application.

What is claimed is:

1. A polarization diversity heterodyne receiving device of a baseband combining type, including optical heterodyne receiving means for receiving an incident signal beam having an incident beam intensity and an incident state of polarization to produce first and second intermediate frequency signals having first and second signal amplitudes, respectively, demodulating means for demodulating said first and said second intermediate frequency signals into first and second baseband signals, respectively, and a signal combiner for combining said first and second baseband signals into a device output signal having an output amplitude independent of said incident state, wherein the improvement comprises:
    adjusting means connected to said heterodyne receiving means for adjusting said first and said second signal amplitudes by a control signal in a common ratio so as to render said output amplitude independent of said incident beam intensity, said adjusting means including means for comparing said output amplitude with a reference amplitude to produce said control signal.

2. A polarization diversity heterodyne receiving device as claimed in claim 1, said heterodyne receiving means comprising optical heterodyne detecting means for detecting said incident signal beam to produce first and second detected signals and intermediate frequency amplifying means for amplifying said first and said second detected signals with first and second gains into said first and said second intermediate frequency signals, respectively, wherein said adjusting means is connected to said intermediate frequency amplifying means to adjust said first and said second gains by said control signal so as to adjust said first and said second signal amplitudes in said common ratio.

3. A polarization diversity heterodyne receiving device as claimed in claim 2, said intermediate frequency amplifying means comprising a first intermediate frequency amplifier for amplifying said first detected signal into a first amplifier output signal, a second intermediate frequency amplifier for amplifying said second detected signal into a second amplifier output signal, and intermediate frequency supply means for supplying said first and said second amplifier output signals to said demodulating means as said first and said second intermediate frequency signals, respectively, wherein:
    said intermediate frequency supply means comprises:
        a first variable gain adjuster for giving said first gain to said first detected signal to produce said first intermediate frequency signal; and
        a second variable gain adjuster for giving said second gain to said second detected signal to produce said second intermediate frequency signal;
    said adjusting means being connected to said first and said second variable gain adjusters for adjusting said first and said second gains by said control signal so as to adjust said first and said second signal amplitudes in said common ratio.

4. A polarization density heterodyne receiving device as claimed in claim 1, wherein said comparing means comprises:
    a reference signal generator for generating a reference signal having said reference amplitude, said reference amplitude representing a level at which said output amplitude should be maintained; and
    a comparator unit supplied with said device output signal and said reference signal for comparing said output amplitude with said reference amplitude to produce said control signal.

* * * * *